United States Patent [19]

Nagai et al.

[11] Patent Number: 5,098,971

[45] Date of Patent: Mar. 24, 1992

[54] FLUORINE-CONTAINING THERMOSETTING RESIN

[75] Inventors: Akira Nagai; Shin Nishimura, both of Hitachi; Akio Takahashi, Hitachiota; Masamichi Maruta, Kawagoe; Akihiro Fukui, Kamifukuoka, all of Japan

[73] Assignees: Hitachi, Ltd.; Central Glass, Co., both of Tokyo, Japan

[21] Appl. No.: 589,605

[22] Filed: Sep. 28, 1990

[30] Foreign Application Priority Data

Sep. 29, 1989 [JP] Japan .................. 1-251833

[51] Int. Cl.[5] .......................................... C08F 122/40
[52] U.S. Cl. ..................... 526/247; 526/248; 526/262
[58] Field of Search ................... 526/247, 248, 262

[56] References Cited

FOREIGN PATENT DOCUMENTS 2636626 9/1989 France .

OTHER PUBLICATIONS

R. T. Morrison and R. N. Boyd, Organic Chemistry, 3rd Ed., Allyn and Bacon, Boston, 1973, pp. 358–365.

Primary Examiner—Joseph L. Schofer
Assistant Examiner—M. Nagumo
Attorney, Agent, or Firm—Antonelli, Terry, Stout & Kraus

[57] ABSTRACT

A fluorine-containing thermosetting resin having a three-dimensional crosslinking structure is obtained by polymerizing a bismaleimide compound having the formula,

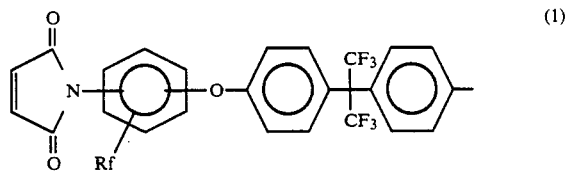

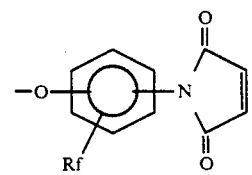

wherein Rf is fluorine, $CF_3$, $C_2F_5$ or $C_3F_7$. The resin is excellent in moldability, thermal resistance and electric properties, has a low dielectric constant, is hence suitable as a molding material and can be used for molding materials, wiring boards, layer insulation films of LSI, etc.

5 Claims, No Drawings

FLUORINE-CONTAINING THERMOSETTING RESIN

The present invention relates to a fluorine-containing thermosetting resin which is excellent in moldability, thermal resistance and electric properties, has a low dielectric constant and is suited for use as an insulating material, and a process for preparing the resin by polymerizing the bismaleimide compound having the formula,

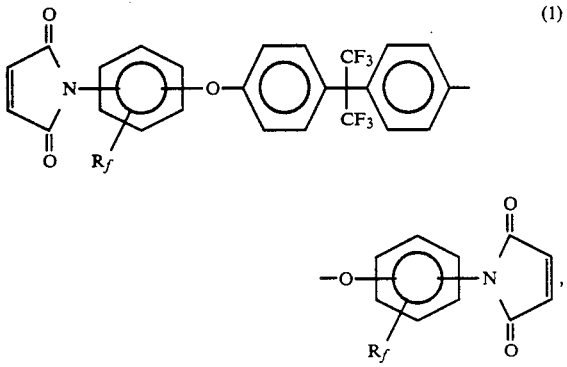

wherein $R_f$ is fluorine, $CF_3$, $C_2F_5$ or $C_3F_7$.

Fluorocarbon resins such as polytetrafluoroethylene (hereinafter PTFE) and hydrocarbon resins such as polyethylene and polybutadiene, have been known as insulating materials having a low dielectric constant and have been widely and generally used. These resins have a dielectric constant of less than 3.

Fluorocarbon resins are excellent from the viewpoints of thermal resistance and electric property. However, since they are generally a thermoplastic resin, they have a certain softening temperature. At temperatures higher than the softening temperature, they show a rapid decrease in mechanical strength and increase in thermal expansion coefficient, therefore, they undergo marked deterioration in properties required for the material. Accordingly, these resins cannot be used at a temperature range higher than the softening temperature and hence their range of application is limited. Further, PTFE has no suitable solvent for preparing a varnish therefrom. It is hence generally obliged to be processed by heat-melt forming. However, the temperature necessary for the forming is as high as 300° C. or more. Further the melt viscosity of PTFE is very high. Thus, PTFE is a material poor in formability and workability.

In the field of hydrocarbon resins, on the other hand, a number of thermosetting resins have been developed including butadiene resins and allyl resins. These resins have a three-dimensionally crosslinked structure. Therefore, they can be expected to be used as a high temperature-resistant material to which a certain mechanical strength and dimensional stability at high temperatures are required. However, hydrocarbon resins, as can be inferred from their chemical structure, are susceptible to oxidation and readily undergo thermal decomposition. Therefore, they are seldom used as a high temperature-resistant material.

A number of resins having heterocyclic aromatic rings, such as an imide ring, are being employed in such a field of uses where high thermal resistance is required. Representatives of such resins are polyimide, polybenzimidazole, polybenzothiazole, etc. Of these, bismaleimide compounds, an addition-type heat resistant material that produces no byproduct such as condensation water at the time of curing, are applied to a variety of uses including various structural materials, FRP (short for fiber reinforced plastic), molding materials, wiring board substrates and layer insulation films of LSI. However, bismaleimide compounds have a disadvantage of having a high dielectric constant. Most of the bismaleimide compounds so far developed have a dielectric constant of more than 3. Moreover, a representative of the compounds, bis(4-maleimidephenyl)-methane (hereinafter BMI), shows a melting point of 158° C. and a polymerization temperature of 180° C. The melting point and the polymerization temperature are very close to each other, so that the processing window (the difference between the melting point and polymerization temperature, hereinafter abbreviated as PW) is only about 20° C. In the range of the PW, the material shows fluidity and can be molded. Therefore, usually, BMI is scarcely used alone. Instead, it is used prepolymerized with a diamine, reactive elastomer, etc. in order to increase the molecular weight and lower the melting point. Only through such modification, it becomes possible to use BMI as a molding material. However, the addition of the second component generally results in a composition having a higher dielectric constant than BMI alone. Such a composition is not suited for the object of the present invention.

A bismaleimide compound has two polymerizable double bonds in the molecule. It undergoes a crosslinking reaction under application of heat or photoirradiation or in the presence of a radical initiator, to yield a cured product having a three-dimensional network structure. The cured product has good mechanical properties and dimensional stability even at high temperatures. So it is suitably used as a heat resistant insulating material. Further, since no reaction byproduct such as condensation water is produced in the crosslinking cure reaction, the crosslinking cure reaction of the bismaleimide compound is advantageous in manufacturing various structural materials, molding materials, etc. In this point, the reaction differs from that of polyimide, polybenzimidazole, polybenzothiazole or the like, which yields typical heat-resistant insulating materials.

A representative choice from bismaleimide compounds is bis(4-meleimidephenyl)methane (hereinafter BMI). However, BMI is disadvantageous in having a high dielectric constant (3.3). Moreover, its melting point (158° C.) and the polymerization temperature (180° C.) are nearly the same, that is, BMI has a PW, the difference between the melting point and polymerization temperature, of only about 20° C. Further, when used alone, BMI is disadvantageous in giving a cured product having a high modulus of elasticity and being very brittle. Therefore, BMI is in general scarcely used alone. Usually, it is used as a molding material after it has been prepolymerized with a diamine, dithiol, reactive elastomer (namely, liquid rubber), etc. However, most of such prepolymerized compositions show a still higher dielectric constant than does a single compound.

In view of this, there have been developed bismaleimide compounds of which flexibility is improved by introducing into the molecule an ether group that has a high bending property. One of the representative choice from such compounds is 2,2-[bis(4-maleimidephenoxy)phenyl]propane. This compound gives a cured product having a low modulus of elasticity and a high breaking strength and hence can be used alone as a molding material. Still, it has a relatively high dielectric constant of 3.1.

According to the present invention, there are provided a fluorine-containing thermosetting resin having a three dimensional crosslinking structure obtained by polymerization of the bismaleimide compound having the formula,

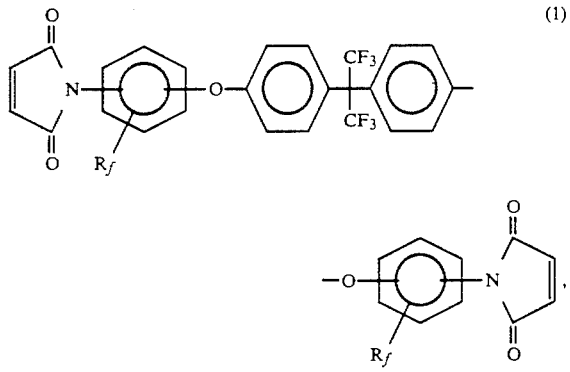

wherein $R_f$ is fluorine, $CF_3$, $C_2F_5$ or $C_3F_7$, and a process for preparing the resin by crosslinking the bismaleimide compound. The thus obtained resin has a heat decomposition temperature of 400° C. or more, a dielectric constant of 3.0 or less and a thermal expansion coefficient of $10 \times 10^{-5} K^{-1}$.

By the present invention, it is now possible to overcome the above-mentioned two difficulties by introducing a fluorine atom into the molecule of the bismaleimide having an ether skeleton. The present inventors have built up a hypothesis that introducing fluorine atoms into the molecule of a bismaleimide compound increases the specific molar volume of the resulting cured product and thereby lowering the dielectric constant of the cured product. On actually synthesizing such a cured product, it has been found that only a specific bismaleimide compound having fluorine atoms at specific positions in the molecule yields a cured product having a dielectric constant of 3 or less. The inventors also have built up a hypothesis that introducing electron-withdrawing fluorines or fluoroalkyl groups in the neighborhood of the maleimide ring having a polymerizable double bond decreases the electron density on the carbon atoms of the double bond and greatly lowers the reactivity of the bond. On actually synthesizing such a monomer and a cured product and examining their properties, it has been found that only a specific bismaleimide compound having fluorine or fluoroalkyl groups having 1 to 3 carbon atoms at specific positions shows a polymerization temperature shifted toward the high temperature side and widens the PW as large as 100° C. or more. The specific fluorine-containing bismaleimide compound thus found shows a large PW, yields a highly flexible cured product and makes unnecessary the use of a second component with attendant increase of the dielectric constant. Therefore, the cured product from the specific bismaleimide compound can be suitably used as an insulating material. Although $R_f$ may be fluorine or fluoroalkyl group having 1 to 3 carbon atoms, it is preferably trifluoromethyl group.

According to the present invention, the reactivity of the double bond of the maleimide compound is reduced by introducing one each fluorine or fluoroalkyl group into the benzene rings adjacent to the maleimide ring. This is because introducing two or more fluorines or fluoroalkyl groups would reduce the reactivity too much and make the compound unusable in practice as a molding material. Accordingly, from the viewpoint of obtaining a product of low dielectric constant, the inventors have attempted to fluorinate the propane skeleton at the center of the molecular structure, which conceivably exerts virtually no influence on the reactivity of the double bond. Based on such a molecular design, the present inventors have actually synthesized a cured product by using the bismaleimide compound having the formula (1) and examined its moldability, thermal resistance, electric properties, etc. As a result, it was found that the cured product is outstanding and well-balanced in these characteristic properties.

The cured product is obtained, for example, by filling the compound into a mold or such at a temperature within the PW where the compound is in molten state, preferably from a temperature 40° C. higher than the melting point to a temperature 20° C. lower than the polymerization initiation temperature, and then heating the compound up to a prescribed polymerization temperature or above to effect crosslinking. At this time, by adding a radical initiator such as a peroxide, the polymerization temperature can be lowered and/or the reaction time can be shortened. When the radical initiator is not used, the polymerization (curing) temperature is usually higher than the polymerization initiation temperature. When the radical initiator is used, the polymerization (curing) temperature is usually higher than the decomposition temperature of the radical initiator. Specific examples of the radical initiators are benzoyl peroxide, p-chlorobenzoyl peroxide, 2,4-dichlorobenzoyl peroxide, lauroyl peroxide, dicumyl peroxide, acetyl peroxide, methyl ethyl ketone peroxide, cyclohexanone peroxide, bis(1-hydroxycyclohexyl peroxide), 2,5-dimethylhexane 2,5-dihydroperoxide, 2,5-dimethyl-2,5-(t-butylperoxy)hexane, 2,5-dimethyl-2,5-(t-butylperoxy)-hexyne-3, 2,5-dimethylhexyl-2,5-di-(peroxybenzoate), cumene hydroperoxide, t-butyl hydroperoxide, t-butyl peroxybenzoate, t-butyl peroxyacetate, t-butyl peroxyoctanoate, t-butyl peroxyisobutyrate, dibenzyl peroxide and di-t-butyl peroxyphthalate. They can be used alone or in admixture of two or more. The amount of the initiator to be added is usually 0.01–5 parts by weight, preferably 0.1–3 parts by weight, per 100 parts by weight of the resin composition. Further, polymerization accelerators, retarders, pigments, fillers etc. may also be added if necessary.

The present invention will be described further in detail below with reference to Examples, but it is in no way limited thereto.

REFERENCE EXAMPLE

Preparation of 1,1,1,3,3,3-hexafluoro-2,2-bis[(4-maleimide-2-trifluoromethylphenoxy)phenyl]propane 1,1,1,3,3,3-Hexafluoro-2,2-bis[(4-maleimide-2-trifluoromethylphenoxy)phenyl]propane, one of the monomers for preparing the presently claimed resin, was prepared as follows:

Fifty grams of 1,1,1,3,3,3-hexafluoro-2,2-bis[(4-amino-2-trifluoromethylphenoxy)phenyl]propane was dissolved in 500 ml of acetone. To this solution, 200 ml of acetone solution containing 18 g of maleic anhydride was added by drops over 4 hours while maintaining the temperature of the solution at 0° to 10° C. by cooling. After the addition had been completed, the mixture was stirred for additional 2 hours at 25° C. in order to allow the reaction to proceed. A slurry was obtained. The slurry was filtered. Washing the residue remained on the filter paper with water and drying the washed residue under reduced pressure gave 51 g of yellow crystals of 1,1,1,3,3,3-hexafluoro-2,2-bis[(4-maleamic acid-2-trifluoromethylphenoxy)phenyl]propane, the intermediate of the intended product, in a yield of 80.6%.

Fifty grams of 1,1,1,3,3,3-hexafluoro-2,2-bis[(4-maleamic acid-2-trifluoromethylphenoxy)phenyl]-propane, 200 g of acetic anhydride and 15 g of potassium acetate were dissolved in 500 ml of acetone. The mixture was stirred for 5 hours while maintaining the temperature at 25° C. by cooling in order to allow the reaction to proceed. The obtained slurry was dropped into a large amount of water to obtain a solid product. The solid product was then filtered, washed with water and dried under reduced pressure to obtain 46 g of yellow crystals of 1,1,1,3,3,3-hexafluoro-2,2-bis[(4-maleimide-2-trifluoromethylphenoxy)phenyl]propane, the crude, intended product, in a yield of 93.3%. Analysis of the crude product by HPLC informed that the purity was 95.8%. Recrystallizing the crude product with ethyl acetate/methanol gave a purified product having a purity of 99.0% in a yield of 64%.

EXAMPLE 1

In 200 of acetone was dissolved 100 of 1,1,1,3,3,3-hexafluoro-2,2-bis[(4-maleimide-2-trifluoromethylphenoxy)phenyl]propane (hereinafter abbreviated as p-HFBP) (available from Central Glass, Co., Ltd.). Then, 0.5 g of t-butyl hydroperoxide (available from Nippon Oil & Fats Co., Ltd.) was added thereto as a radical initiator. The solvent was removed by vacuum drying to obtain a powdery sample.

The sample was press-molded by using a spacer of 2 mm thickness under the following conditions to obtain a resin sheet of the cured product. The sample was molten at 150° C., then brought up to 250° C., and pressed at the temperature for 1 hour while heating. The dielectric constant, thermal expansion coefficient and heat decomposition temperature of the resin sheet thus obtained were determined. On the other hand, the melting point and polymerization initiation temperature of the p-HFBP were determined by differential thermal analysis.

EXAMPLE 2

A cured product of the p-HFBP used in Example 1 was obtained through press molding by heat polymerization alone without addition of a radical initiator. Curing was effected by melting the sample at 150° C., then raising the temperature, and pressing the sample at 250° C. for 1 hour and at 280° C. for 1 hour. The properties of the resin sheet thus obtained were evaluated in the same manner as in Example 1.

EXAMPLE 3

In 200 g of acetone was dissolved 100 g of 1,1,1,3,3,3-hexafluoro-2,2-bis[(5-maleimide-3-trifluoromethylphenoxy)phenyl]propane (hereinafter abbreviated as m-HFBP) (available from Central Glass Co., Ltd.). Then, 1 g of 2,5-dimethyl-2,5-(t-butylperoxy)-hexyne-3 (available from Nippon Oil & Fats Co., Ltd.) was added thereto as a radical initiator. The solvent was removed by vacuum drying to obtain a powdery sample.

The sample was molded in a die using a spacer of 2 mm thickness to obtain a resin sheet. Curing was effected by melting the sample at 150° C., defoaming the melt, heating the melt to 250° C. and keeping it pressed at the temperature for 1 hour. The properties of the resin sheet thus obtained were evaluated in the same manner as in Example 1.

EXAMPLE 4

One hundred grams of the p-HFBP used in Example 1 was dissolved in 200 g of methyl isobutyl ketone and prepolymerized under reflux at 120° C. for 60 minutes. After the reaction mixture had been cooled down to room temperature, 0.2 g of dicumyl peroxide (available from Nippon Oil & Fats Co., Ltd.) was added thereto as a radical initiator, and the solvent was removed by vacuum drying to obtain a powdery sample.

The sample was press-molded in the same manner as in Example 1 to obtain a resin sheet. Curing was effected by application of heat and pressure at 200° C. for 1 hour. The properties of the resin sheet obtained were evaluated in the same manner as in Example 1.

COMPARATIVE EXAMPLE 1

Bis(4-maleimidephenyl)methane (BMI) (available from Mitsui Toatsu Chemicals, Inc.) was press-molded in the same manner as in Example 2. Curing was effected by melting the sample at 175° C., then heating it to 220° C. and applying heat and pressure at the temperature for 1 hour. The properties of the resin sheet thus obtained were evaluated in the same manner as in Example 1. On the other hand, the thermal behavior of the BMI was examined by differential thermal analysis in the same manner as in Example 1.

COMPARATIVE EXAMPLE 2

2,2-[Bis(4-maleimidephenoxy)phenyl]propane (BBMI) (available from Hitachi Chemical Co., Ltd.) was press-molded in the same manner as in Example 2. Curing was effected by melting the sample at 180° C., then heating it to 220° C. and applying heat and pressure at the temperature for 1 hour. The properties of the resin sheet thus obtained were evaluated in the same manner as in Example 1. On the other hand, the thermal behavior of the BBMI was examined by differential thermal analysis in the same manner as in Example 1.

The results obtained in Examples and Comparative Examples are shown in Tables 1 and 2.

TABLE 1

| | Properties of cured product | | |
|---|---|---|---|
| | Dielectric constant | Thermal expansion coefficient ($10^{-5} K^{-1}$) | Heat decomposition temperature (°C.) |
| Example 1 | 2.7 | 6.8 | 435 |
| Example 2 | 2.7 | 8.8 | 420 |
| Example 3 | 2.8 | 7.3 | 430 |
| Example 4 | 2.8 | 6.6 | 440 |
| Comp. Example 1 | 3.3 | 6.1 | 420 |
| Comp. Example 2 | 3.1 | 6.1 | 390 |

TABLE 2

| | Melting point and polymerization initiation temperature | | |
|---|---|---|---|
| | Melting point (°C.) | Polymerization initiation temperature (°C.) | PW |
| Example 1 | 113 | 270 | 157 |
| Comp. Example 1 | 158 | 180 | 22 |
| Comp. Example 2 | 142 | 230 | 88 |

The present inventors have build up a hypothesis that introduction of a number of fluorine atoms into the molecule of a bismaleimide compound enables the resulting cured product to increase its specific molar volume and lower its dielectric constant. They have further build up a hypothesis that since fluorine or fluoroalkyl group is an electron withdrawing substituent, it reduces the reactivity of the double bond, elevates the polymerization temperature, enlarges the PW and widens the range of molding temperature. Further, they have build up a hypothesis that since the bond dissociation energy between fluorine and carbon is large, the heat decomposition initiation temperature, which is a criterion of thermal resistance, can also be increased. However, the effect by these hypotheses could not be confirmed until the present inventors have actually synthesized the compound and the cured product and have evaluated the properties thereof.

Based on the molecular design described above, the fluorine-containing maleimide compound was actually synthesized, then examined for its property and found to be excellent in moldability. Further, its cured product was actually synthesized, examined for its property and found to be excellent in thermal resistance. The cured product showed a dielectric constant, an important electrical characteristic of an insulating material, of 3 or less. Accordingly, the cured product is a material having a wide variety of applications where a low dielectric constant is required, including molding materials, wiring board substrates and layer insulation films of LSI.

What is claimed is:

1. A fluorine-containing thermosetting resin having a three-dimensionally crosslinking structure and being a homopolymer of a bismaleimide compound having the formula,

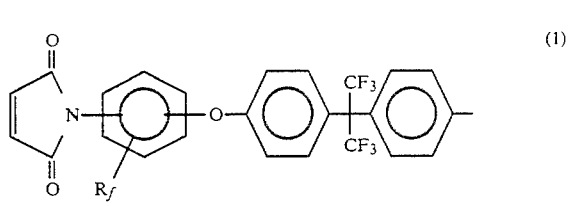

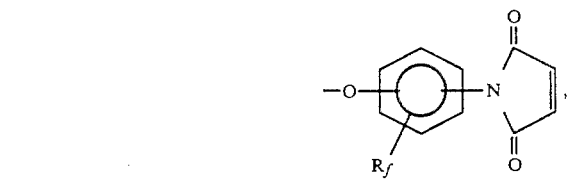

wherein $R_f$ is fluorine, $CF_3C_2F_5$ or $C_3F_7$.

2. The resin of claim 1, which has a heat decomposition temperature of 400° C. or more, a dielectric constant of 3.0 or less and a thermal expansion coefficient of $10 \times 10^{-5} K^{-1}$ or less.

3. The resin of claim 1, wherein the bismaleimide compound has the formula,,

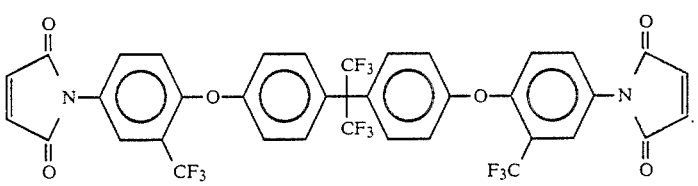

4. The resin of claim 1, wherein the bismaleimide compound has the formula,

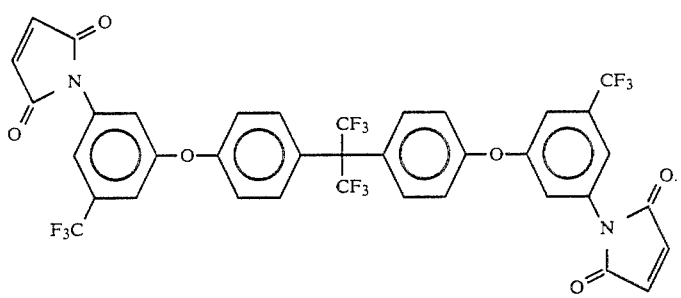

5. A process for homo polymerizing a bismaleimide compound having the formula,

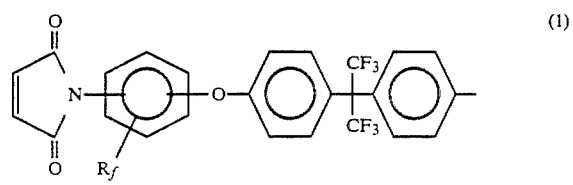

-continued

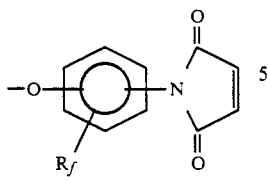

wherein $R_f$ is fluorine, $CF_3$, $C_2F_5$ or $C_3F_7$, which comprises the steps of:

molding the bismaleimide compound from a temperature 40° C. higher than the melting point to a temperature 20° C. lower than the polymerization initiation temperature, and curing the molded compound in the absence of a radical initiator at a temperature higher than the polymerization initiation temperature of the bismaleimide compound, or alternatively, curing the molded compound in the presence of a radical initiator at a temperature higher than the decomposition temperature of the radical initiator.

* * * * *